(12) United States Patent
Wang

(10) Patent No.: US 7,842,892 B2
(45) Date of Patent: Nov. 30, 2010

(54) APPARATUS AND METHOD FOR MEASURING THE BODY WEIGHT

(76) Inventor: Suzanne Wang, No. 91, Alley 17, Lane 99, Sec. 3, Kangning Rd., Neihu District, Taipei City 114 (TW)

( * ) Notice: Subject to any disclaimer, the term of this patent is extended or adjusted under 35 U.S.C. 154(b) by 1044 days.

(21) Appl. No.: 11/602,360

(22) Filed: Nov. 21, 2006

(65) Prior Publication Data

US 2008/0115592 A1 May 22, 2008

(51) Int. Cl.
*G01G 19/52* (2006.01)
*A47C 27/10* (2006.01)

(52) U.S. Cl. .................. 177/144; 177/208; 177/254; 5/710

(58) Field of Classification Search ............... 177/208, 177/209, 254, 144; 5/710, 713, 714
See application file for complete search history.

(56) References Cited

U.S. PATENT DOCUMENTS

| | | | | |
|---|---|---|---|---|
| 4,686,722 A * | 8/1987 | Swart | ............... | 5/713 |
| 4,797,962 A * | 1/1989 | Goode | ............... | 5/713 |
| 4,942,634 A * | 7/1990 | Saloff et al. | ............... | 5/682 |
| 5,022,110 A * | 6/1991 | Stroh | ............... | 5/710 |
| 5,044,029 A * | 9/1991 | Vrzalik | ............... | 5/713 |
| 5,802,640 A * | 9/1998 | Ferrand et al. | ............... | 5/617 |
| 5,904,219 A | 5/1999 | Anahid et al. | | |
| 5,979,010 A * | 11/1999 | Dockery et al. | ............... | 15/250.04 |
| 6,045,155 A * | 4/2000 | Cech et al. | ............... | 280/735 |
| 6,056,079 A | 5/2000 | Cech et al. | | |
| 6,058,341 A * | 5/2000 | Myers et al. | ............... | 701/45 |
| 6,094,762 A * | 8/2000 | Viard et al. | ............... | 5/713 |
| 6,148,461 A * | 11/2000 | Cook et al. | ............... | 5/713 |
| 6,349,439 B1 | 2/2002 | Cook et al. | | |
| 6,668,408 B2 * | 12/2003 | Ferrand et al. | ............... | 5/710 |
| 6,941,598 B2 * | 9/2005 | Ferrand et al. | ............... | 5/600 |
| 6,943,694 B1 | 9/2005 | Ellis | | |
| 7,107,641 B2 * | 9/2006 | Davis | ............... | 5/710 |
| 7,219,380 B2 * | 5/2007 | Beck et al. | ............... | 5/713 |
| 7,376,995 B2 * | 5/2008 | Davis | ............... | 5/710 |
| 7,459,645 B2 * | 12/2008 | Skinner et al. | ............... | 177/144 |
| 7,627,910 B2 * | 12/2009 | Davis | ............... | 5/81.1 R |
| 2001/0029628 A1 * | 10/2001 | Ferrand et al. | ............... | 5/600 |
| 2003/0051292 A1 * | 3/2003 | Ferrand et al. | ............... | 5/600 |
| 2004/0139546 A1 * | 7/2004 | Ferrand et al. | ............... | 5/425 |
| 2006/0236464 A1 * | 10/2006 | Beck et al. | ............... | 5/713 |
| 2007/0006385 A1 * | 1/2007 | Davis | ............... | 5/710 |
| 2009/0084609 A1 * | 4/2009 | Skinner et al. | ............... | 177/144 |

FOREIGN PATENT DOCUMENTS

| | | |
|---|---|---|
| DE | 198 08 838 A1 | 9/1999 |
| WO | WO-00/26049 A1 | 5/2000 |
| WO | WO-2005/059486 A1 | 6/2005 |

\* cited by examiner

*Primary Examiner*—Randy W Gibson
(74) *Attorney, Agent, or Firm*—Birch, Stewart, Kolasch & Birch, LLP

(57) ABSTRACT

An apparatus and a method for measuring a body weight of a user are provided. The apparatus includes a container containing a fluid inside for supporting the user, a fluid sensor measuring a pressure of the fluid inside the container, and a control unit determining the body weight of the user. The fluid sensor measures a change of the pressure as the user lying on the container, and the control unit determines the body weight of the user based on the change of the pressure.

10 Claims, 4 Drawing Sheets

US 7,842,892 B2

APPARATUS AND METHOD FOR MEASURING THE BODY WEIGHT

FIELD OF THE INVENTION

This invention generally relates to the field of measuring the body weight of a user. More specifically, the invention relates to a pressure pad for measuring the body weight of a patient.

BACKGROUND OF THE INVENTION

There are many ways to measure body weights. For some people, it is not convenient to utilize normal platform scales to measure their body weights. Especially for the patients who cannot move themselves, measuring their body weights precisely and efficiently becomes a challenge of medical engineers. For some pressure mattresses, the pressure inside the mattresses can be adjusted according to the users' body weights. Therefore, measuring a user's (or a patient's) body weight is an important task. There are some methods utilizing an additional weight-measuring device arranged under a mattress to measure a patient's body weight. However, an additional device means additional cost, and the maintenance of the additional device is another burdensome extra-work. Thus, convenient and efficient apparatus and method for measuring a user's body weight is definitely needed.

SUMMARY OF THE INVENTION

The object of the present invention is to provide an apparatus for measuring a user's body weight precisely and efficiently.

Another object of the present invention is to provide a method for measuring a user's body weight precisely and efficiently.

Yet another object of the present invention is to provide an apparatus with an emergence power supply for maintaining the normal function of the apparatus.

Other objects and advantages of the present invention will become apparent from the following descriptions, taken in connection with the accompanying drawings, wherein, by way of illustration and example, several embodiments of the present invention are disclosed.

BRIEF DESCRIPTION OF THE DRAWINGS

The drawings constitute a part of this specification and include exemplary embodiments of the invention, which may be embodied in various forms. It is to be understood that in some instances, various aspects of the invention may be shown exaggerated or enlarged to facilitate an understanding of the invention.

FIG. 4b is a schematic diagram, illustrating the relationships between the weight and the measured pressure obtained from FIG. 4a.

FIG. 4c is a schematic diagram, illustrating the relationships between the weight and the time interval value obtained from FIG. 4a.

DETAILED DESCRIPTION OF THE INVENTION

Figure 1:
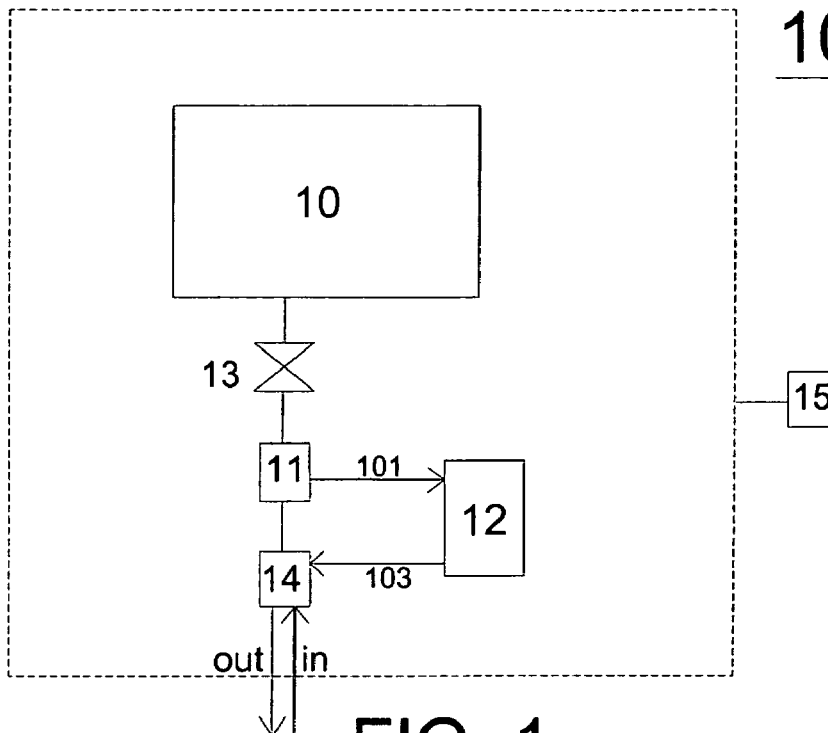
FIG. 1 is a schematic view illustrating a preferred embodiment of the present invention.
Figure 4A:
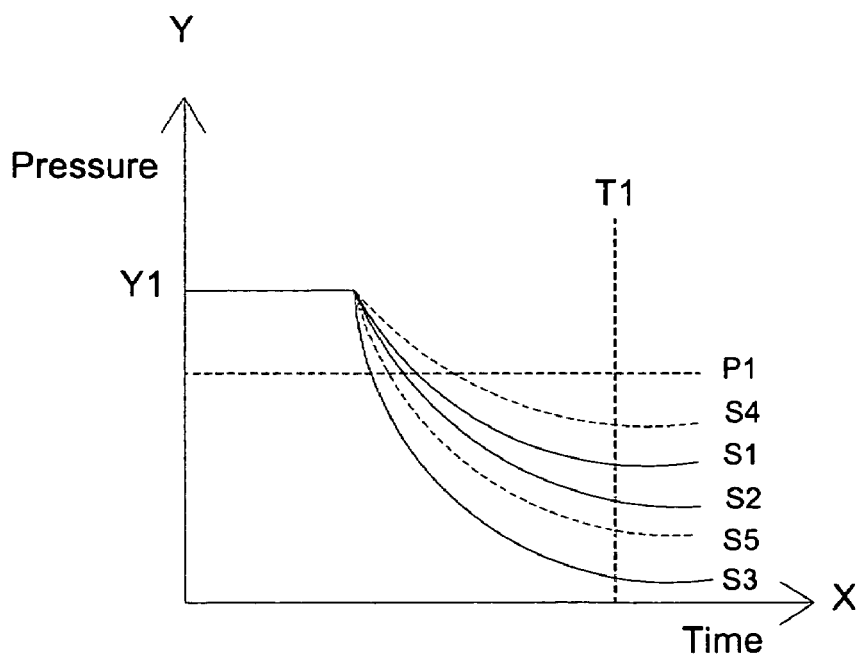
FIG. 4a is a schematic diagram, illustrating the specific curves of the present invention.

FIG. 1 is a schematic view illustrating a preferred embodiment of the present invention. The apparatus 100 for measuring a body weight of a user includes a container 10, a fluid sensor 11, a control unit 12, a valve 13, a driving device 14 and an emergent power supply 15. The container 10 is a hollow structure and contains fluid (e.g. air) inside for supporting the user. The container 10 can be embodied as an air-cushion mattress and the like. The container 10 can further include several separated cells, and details of the container 10 will be discussed later (FIG. 4a and the corresponding descriptions). The fluid sensor 12 is connected to the container 10 (through the valve 13) and measures the physical property of the fluid inside the container 10. The control unit 12 is connected to the fluid sensor 11 and receives the physical property change data 101 and storages the data for further reference. The physical property of the fluid in this embodiment is the fluid pressure. In other embodiments, the physical property can be the flow rate or any other properties of the fluid. The valve 13 is connected to the container 10 and allows the fluid flowing into or out of the container 10. The driving device 14 provides driving force for the fluid flowing into the container 10. If necessary, the driving device 14 can also drive the fluid out of the container 10. The driving device 14 can be embodied as a pump, a blower, or other devices with the similar function. The emergent power supply 15 provides a power when a normal supply fails. The emergent power supply 15 can be connected to any element/component/device that needs electrical power in the apparatus 100. The emergent power supply 15 facilitates the apparatus to perform its function more stably.

Before measuring the user's body weight, a reference database (not illustrated in FIG. 1) first. In the preferred embodiment, the reference data are saved as specific curves (for details, please refer to FIG. 4a-4c). Referring to FIG. 1, before the user with specific weight lies on the container 10, the driving device 14 drives the fluid into the container 10 until the pressure of the fluid in the container reaches an initial predetermined pressure Y1 (Please refer to the description of FIG. 4a). As the user lies down on the container 10, the pressure of the fluid in the container 10 starts to change because the external force (the user's body weight) applies on it. The fluid sensor 11 measures the pressure change of the fluid inside the container 10 and transmits the pressure change data 101 to the control unit 12. The control unit 12 records the pressure change data 101 for a predetermined time period and obtains one specific curve of the specific weight in the reference database. Repeating the procedure above several times to complete the reference database. The more users with specific weights are measured, the more precisely the apparatus 100 performs. In other embodiments, different objects with different weights can also be used to build up the reference database.

Once the reference database is built up completely, the apparatus 100 can be implemented to measure a user's body weight and further adjust the fluid pressure inside the container 10 according to the body weight of the user. First, the driving device 14 controls the fluid pressure in the container 10 to reach an initial predetermined pressure Y1. Then the fluid sensor 11 measures the pressure change data 101 of the fluid inside the container 10 and transmits it to the control unit 12. The control unit 12 records the pressure change data 101 for a predetermined time period and obtains a new specific curve of the user whose weight to be determined. Then the control unit 12 compares the new specific curve with the specific curves existing in the reference database, to obtain the weight of the user, by extrapolation or interpolation methods. After obtaining the body weight of the user, the control unit 12 sends a signal 103 to control the driving device 14 to adjust the fluid pressure inside the container 10, in order to support the user appropriately.

In another embodiment of the apparatus 100 in the present invention, the driving device 14 makes the fluid pressure in the container 10 reach an initial predetermined pressure Y1 first. Then the user lies down on the container 10. After a predetermined time period (e.g. 10 seconds, or T1 illustrated in FIG. 4a), the fluid sensor 11 measures the pressure change data 101 of the fluid inside the container 10 and transmits it to the control unit 12. By the pressure change data 101, the control unit 12 determines the user's body weight according to the reference database built up in advance. Regarding how to determine the user's body weight, details please refer to FIGS. 4a and 4b and the corresponding descriptions thereof.

In another embodiment of the apparatus 100 in the present invention, the driving device 14 makes the fluid pressure in the container 10 reach an initial predetermined pressure Y1 first. Then the user lies down on the container 10. When the fluid sensor 11 measures that the fluid pressure inside the container 10 equals a predetermined pressure (e.g. 20 mmHg, or P1 illustrated in FIG. 4a), the fluid sensor 11 transmit a signal 101 to inform the control unit 12. Then the control unit 12 records the time interval from the initial predetermined pressure dropping to the predetermined pressure. By the recorded time interval, the control unit 12 determines the user's body weight according to the reference database built up in advance. Regarding how to determine the user's body weight, details please refer to FIGS. 4a and 4c and the corresponding descriptions thereof.

Figure 2:
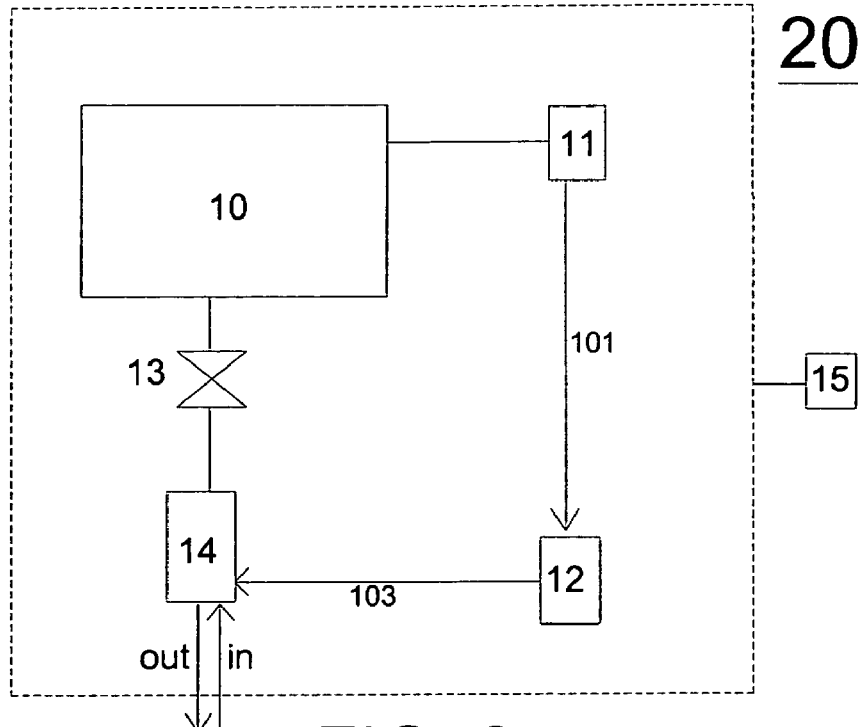
FIG. 2 is a schematic view illustrating another embodiment of the present invention.

FIG. 2 is a schematic view illustrating another embodiment of the present invention. The apparatus 200 for measuring a body weight of a user includes a container 10, a fluid sensor 11, a control unit 12, a valve 13, a driving device 14, and an emergent power supply 15. Different from the apparatus 100 described in FIG. 1, the fluid sensor 11 here is connected to the container 10 directly. The container 10 is a hollow structure and contains fluid (e.g. air) inside for support the user. The container 10 can be embodied as an air-cushion mattress and the like. The container 10 can further include several separated cells (details please refer to FIG. 4a and the corresponding description). The fluid sensor 12 is connected to the container 10 directly and measures the physical property of the fluid inside the container 10. The control unit 12 is connected to the fluid sensor 11 and receives the physical property change data 101 and storages the same for further reference. The physical property of the fluid in this embodiment is the fluid pressure. In other embodiments, the physical property can be the flow rate or any other properties of the fluid. The valve 13 is connected to the container 10 and allows the fluid flowing into or flowing out from the container 10. The driving device 14 provides driving force for the fluid flowing into the container 10. If necessary, the driving device 14 can also drive the fluid out from the container 10. The driving device 14 can be embodied as a pump, a blower or other devices with the similar function. The emergent power supply 15 provides a power when a normal supply fails. The emergent power supply 15 can be connected to any element/component/device that needs electrical power in the apparatus 200. The emergent power supply 15 facilitates the apparatus to perform its function more stably.

Before measuring a user's body weight, the apparatus 200 also has to build up the reference database with the specific curves by the similar procedure mentioned above. Once the reference database is built up completely, the apparatus 200 can measure a user's body weight and further adjusts the fluid pressure inside the container 10 according to the body weight of the user. First, the driving device 14 controls the fluid pressure in the container 10 to reach an initial predetermined pressure Y1. Then the fluid sensor 11 measures the pressure change data 101 of the fluid inside the container 10 and transmits it to the control unit 12. The control unit 12 records the pressure change data 101 for a predetermined time period and obtains a new specific curve of the user whose weight to be determined. Then the control unit 12 compares the new specific curve with the specific curves existing in the reference database, to obtain the weight of the user, by extrapolation or interpolation methods. After obtaining the body weight of the user, the control unit 12 sends a signal 103 to control the driving device 14 to adjust the fluid pressure inside the container 10, in order to support the user appropriately.

In another embodiment of the apparatus 200 in the present invention, the driving device 14 makes the fluid pressure in the container 10 reach an initial predetermined pressure Y1 first. Then the user lies down on the container 10. After a predetermined time period (e.g. 10 seconds, or T1 illustrated in FIG. 4a), the fluid sensor 11 measures the pressure change data 101 of the fluid inside the container 10 and transmits it to the control unit 12. By the pressure change data 101, the control unit 12 determines the user's body weight according to the reference database built up in advance. Regarding how to determine the user's body weight, details please refer to FIGS. 4a and 4b and the corresponding descriptions thereof.

In another embodiment of the apparatus 200 in the present invention, the driving device 14 makes the fluid pressure in the container 10 reach an initial predetermined pressure Y1 first. Then the user lies down on the container 10. When the fluid sensor 11 measures that the fluid pressure inside the container 10 equals a predetermined pressure (e.g. 20 mmHg, or P1 illustrated in FIG. 4a), the fluid sensor 11 transmit a signal 101 to inform the control unit 12. Then the control unit 12 records the time interval from the initial predetermined pressure dropping to the predetermined pressure. By the recorded time interval, the control unit 12 determines the user's body weight according to the reference database built up in advance. Regarding how to determine the user's body weight, details please refer to FIGS. 4a and 4c and the corresponding descriptions thereof.

Figure 3:
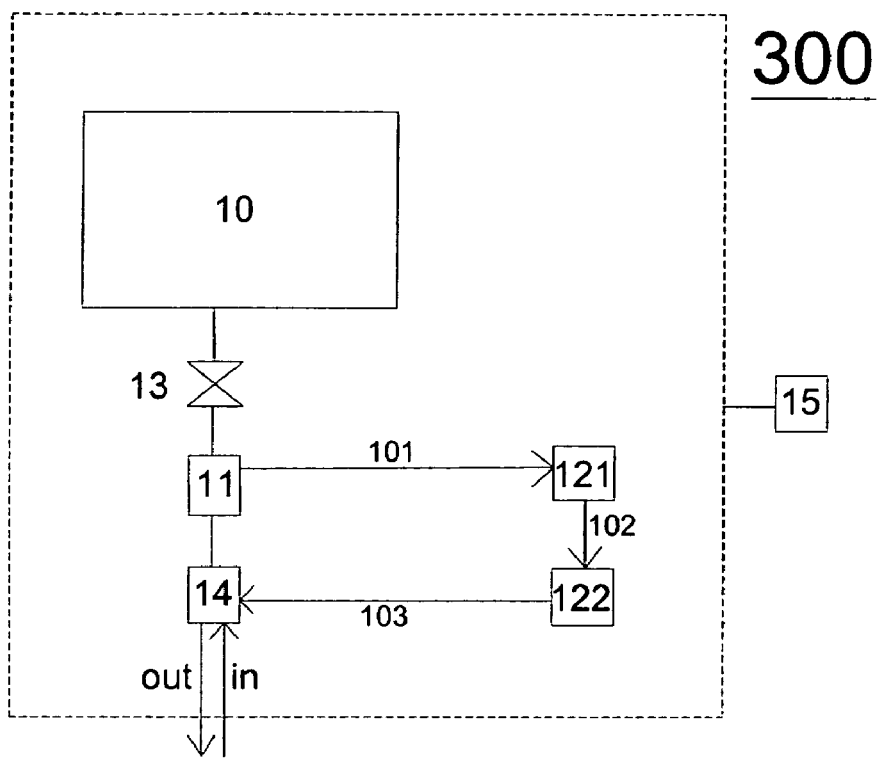
FIG. 3 is a schematic view illustrating another embodiment of the present invention.

FIG. 3 is a schematic view illustrating another embodiment of the present invention. The apparatus 300 for measuring a body weight of a user includes a container 10, a fluid sensor 11, a control unit 121, a modification device 122, a valve 13, a driving device 14, and an emergent power supply 15. Different from the apparatus 100 described in FIG. 1, the apparatus 300 includes a control unit 121 and modification device 122 independently, while the apparatus 100 includes only a control unit 12. The container 10 is a hollow structure and contains fluid (e.g. air) inside for support the user. The container 10 can be embodied as an air-cushion mattress and the like. The container 10 can further include several separated cells (details please refer to FIG. 4a and the corresponding description). The fluid sensor 11 is connected to the container 10 (through the valve 13) and measures the physical property of the fluid inside the container 10. The control unit 121 is connected to the fluid sensor 11 and receives the physical property change data 101 and storages the same for further reference. The physical property of the fluid in this embodiment is the fluid pressure. In other embodiments, the physical property can be the flow rate or any other properties of the fluid. The valve 13 is connected to the container 10 and allows the fluid flowing into or flowing out from the container 10. The driving device 14 provides driving force for the fluid flowing into the container 10. If necessary, the driving device 14 can also drive the fluid out from the container 10. The driving device 14 can be embodied as a pump, a blower or other devices with the similar function. The emergent power supply 15 provides a power when a normal supply fails. The emergent power supply 15 can be connected to any element/component/device that needs electrical power in the apparatus 300. The emergent power supply 15 facilitates the apparatus to perform its function more stably.

Before measuring a user's body weight, the apparatus 300 also has to build up the reference database with the specific curves by the similar procedure mentioned above. Once the reference database is built up completely, the apparatus 300 can measure a user's body weight and further adjusts the fluid pressure inside the container 10 according to the body weight of the user. First, the driving device 14 controls the fluid pressure in the container 10 to reach an initial predetermined pressure Y1. Then the fluid sensor 11 measures the pressure change data 101 of the fluid inside the container 10 and transmits it to the control unit 121. The control unit 121 records the pressure change data 101 for a predetermined time period and obtains a new specific curve of the user whose weight to be determined. Then the control unit 121 compares the new specific curve with the specific curves existing in the reference database, to obtain the weight of the user, by extrapolation or interpolation methods. After obtaining the body weight of the user, the control unit 121 controls 102 the modification device 122 to transmit a signal 103 to the driving device 14 to adjust the fluid pressure inside the container 10, in order to support the user appropriately.

In another embodiment of the apparatus 300 in the present invention, the driving device 14 makes the fluid pressure in the container 10 reach an initial predetermined pressure Y1 first. Then the user lies down on the container 10. After a predetermined time period (e.g. 10 seconds, or T1 illustrated in FIG. 4a), the fluid sensor 11 measures the pressure change data 101 of the fluid inside the container 10 and transmits it to the control unit 12. By the pressure change data 101, the control unit 12 determines the user's body weight according to the reference database built up in advance. Regarding how to determine the user's body weight, details please refer to FIGS. 4a and 4b and the corresponding descriptions thereof.

In another embodiment of the apparatus 300 in the present invention, the driving device 14 makes the fluid pressure in the container 10 reach an initial predetermined pressure Y1 first. Then the user lies down on the container 10. When the fluid sensor 11 measures that the fluid pressure inside the container 10 equals a predetermined pressure (e.g. 20 mmHg, or P1 illustrated in FIG. 4a), the fluid sensor 11 transmit a signal 101 to inform the control unit 12. Then the control unit 12 records the time interval from the initial predetermined pressure dropping to the predetermined pressure. By the recorded time interval, the control unit 12 determines the user's body weight according to the reference database built up in advance. Regarding how to determine the user's body weight, details please refer to FIGS. 4a and 4c and the corresponding descriptions thereof.

FIG. 4a is a schematic diagram, illustrating the specific curves of the present invention. The pressure Y1 represents the initial predetermined fluid in the container 10. The exemplified specific curves S1, S2 and S3 are plotted in accordance with the reference data measured by the fluid sensor 11. Each specific curve of S1, S2 and S3 represents different body weight of the user. To estimate a new user's body weight, we have to obtain a new specific curve of the new user first and compare the new specific curve with the existing ones. For example, if the new specific curve is shown as S4 in the FIG. 4a, we can estimate the body weight that the specific curve S4 represents by extrapolation method referring to S1. In another example, if the new specific curve is shown as S5 in the FIG. 4a, we can estimate the body weight that the specific curve S5 represents by interpolation method referring to S2 and S3.

Figure 4B:
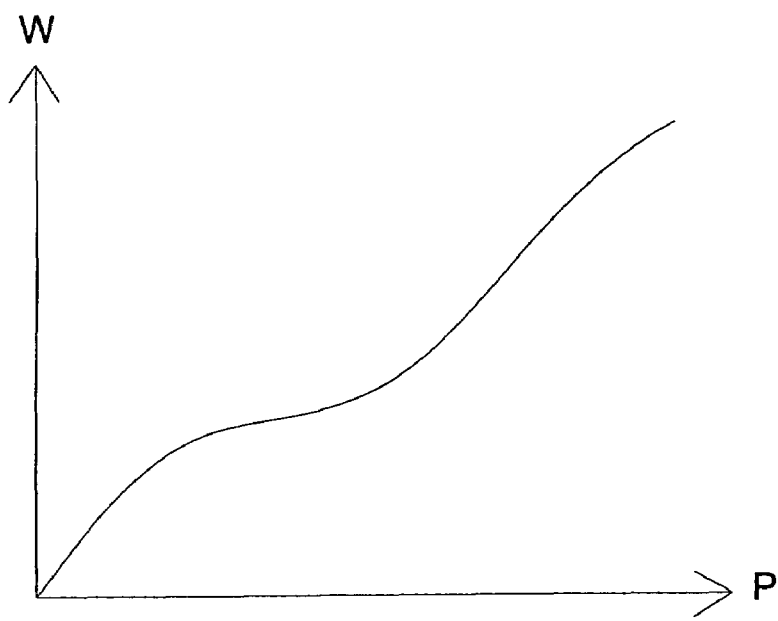

Referring to FIGS. 4a and 4b, after enough specific curves are collected, there is another method to determine the user's body weight other than directly comparing the existing specific lines with the new specific line. After a predetermined time period T1 from the user lying down on the container 10, different specific curves (representing different users' weights) have different pressure values as shown in FIG. 4b. According to the relationship between the user's body weight (V) and the pressure value (P) measured after time interval T1 from the user lying down on the container 10, the control unit 12 can directly determine the user's body weight (W) by corresponding measured pressure value (P) of the new user. Please note that the relationship between the user's body weight (W) and the measured pressure value (P) is not limited by FIG. 4b. In other embodiments, the relationships between the user's body weight (W) and the measured pressure value (P) can be represented by different curves (including a straight line, if P and W have a linear relationship), depending on different adopted statistic schemes.

Figure 4C:
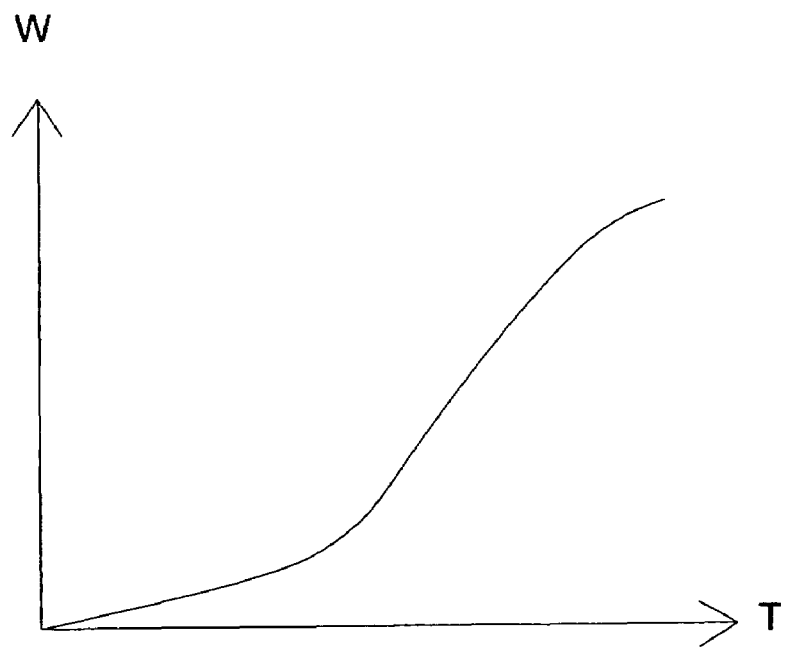

Referring to FIGS. 4a and 4c, after enough specific curves are collected, there is yet another method to determine the user's body weight other than directly comparing the existing specific lines with the new specific line. The control unit 12 records the time interval from the user lying down on the container 10, to the time that the fluid sensor 11 measures the fluid pressure equaling to the predetermined pressure P1. Different specific curves (representing different users' weights) have different time interval values (T) as shown in FIG. 4c. According to the relationship between the user's body weight (W) and the time interval value (T), the control unit 12 can directly determine the user's body weight (W) by corresponding time interval value (T) of the new user. Please note that the relationship between the user's body weight (W) and the time interval value (T) is not limited by FIG. 4b. In other embodiments, the relationships between the user's body weight (W) and the time interval value (T) can be represented by different curves (including a straight line, if T and W have a linear relationship), depending on different adopted statistic schemes.

Figure 5:
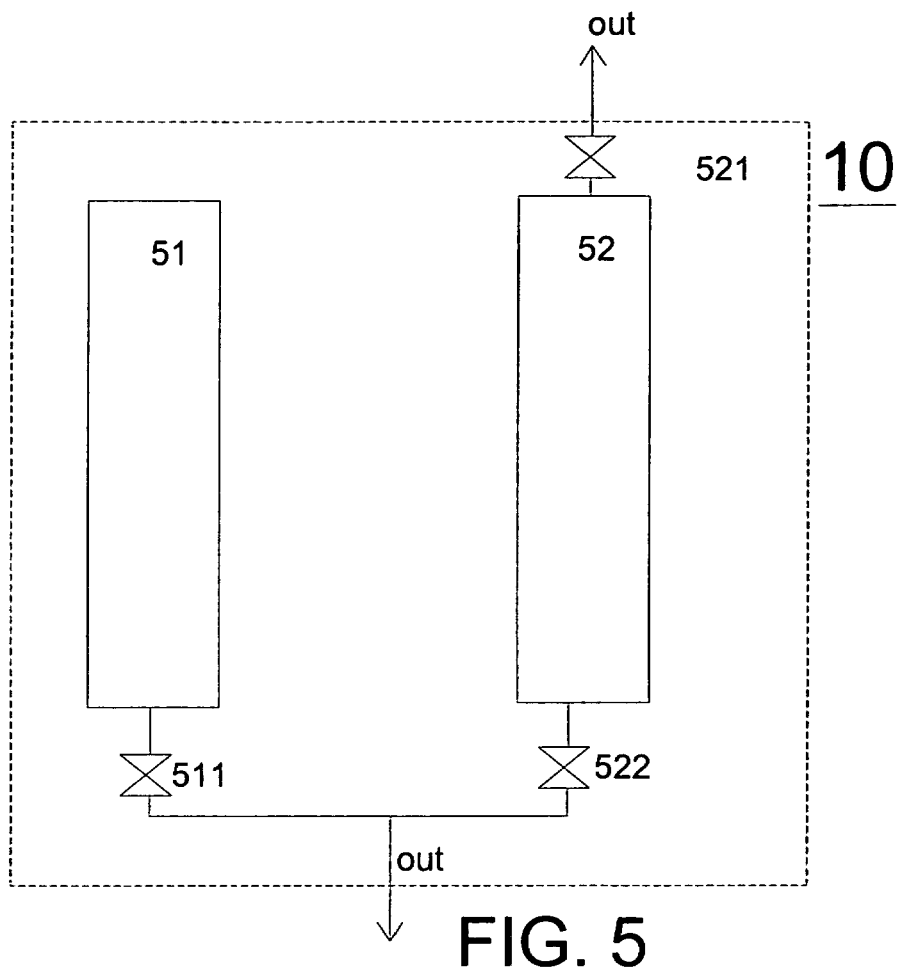
FIG. 5 is a schematic view, illustrating an embodiment of the container of the present invention.

FIG. 5 is a schematic view, illustrating an embodiment of the container 10 of the present invention. As shown in FIG. 5, the container 10 further contains a first cell 51 and a second cell 52 for containing the fluid. The first cell 51 defines an opening 511 while the second cell 52 defines two openings 521 and 522 for facilitating the fluid contained in the second cell 52 flowing out faster than the fluid contained in the first cell 51. When a user lies down on the container 10, the first cell 51 supports the user's upper body/head, and the second cell 52 supports the user's lower limbs/legs. During the fluid inside the container 10 flows out, the fluid in the second cell 52 flowing our faster makes the user feel more comfortable than the other way around (the fluid in the first cell 52 flowing our faster), for the ergonomic reason (human beings feel more comfortable when their heads are higher than their legs). In other embodiment (not illustrated), the second cell 52 can define the same number as the first cell 51 does (even less), if the openings of the second cell 52 (the second opening) are larger than the openings of the first cell 51 (the first opening).

In other embodiments, the cell number in container 10 is not limited by FIG. 5. The arrangement can be changed according to the user's need without departing from the scope of the present invention.

In the embodiments of the present invention, the apparatus for measuring a user's body weight further includes an emergent power supply (not illustrated), for providing a power when a normal supply fails. The emergent power supply can be connected to any element/component/device that needs electrical power. The emergent power supply facilitates the apparatus to perform its function more stably.

In other embodiments of the present invention, the container 10 can be embodied as an air-pressure pad designed for bedridden patients. By this invention, the patient's body weight can be measured in an efficient way without moving the patient. After determining the body weight of the patient, the pressure inside the container 10 can be adjusted to provide appropriate support for the patient.

In other embodiments of the present invention, the physical property of the fluid other than pressure can be measured by the fluid sensor 11. By similar schemes described in FIGS. 4a and 4b, the reference database of the physical property (e.g. the flow rate) can be built, and the user's body weight can be determined according to the reference database in a similar way described above.

Figure 6:
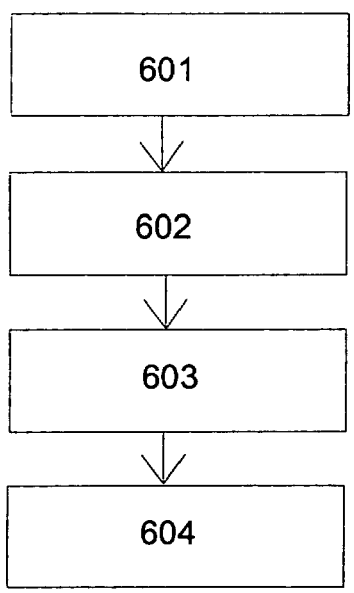
FIG. 6 is a flowchart, illustrating an embodiment of the measuring method of the present invention.

FIG. 6 is a flowchart, illustration an embodiment of the measuring method of the present invention. The method for measuring a body weight of a user of the present invention is used with an apparatus, including but not limited to, the apparatus 100, 200 and 300 mentioned in FIGS. 1, 2 and 3 respectively. The method includes: (a) measuring the initial pressure of the fluid inside the container by the fluid sensor 601; (b) measuring a change of the pressure of the fluid inside the container by the fluid sensor as the user lies on the container 602; (c) determining the body weight of the user based on the change of the physical property by the control unit 603; (d) adjusting the fluid pressure inside the container 10 according to the body weight of the user. Other embodiments of the method measuring a user's weight of the present invention, please refer to the detail descriptions for FIGS. 1-5 mentioned above.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The invention claimed is:

1. An apparatus for measuring a body weight of a user, the apparatus comprising:
a container containing a fluid inside for supporting the user, wherein the container includes a first cell and a second cell, the first cell defines a first opening, the second cell defines a second opening, and the second opening is larger than the first opening for facilitating the fluid contained in the second cell flowing out faster than the fluid contained in the first cell;
a fluid sensor connected to the container, for measuring a physical property of the fluid inside the container; and
a control unit connected to the fluid sensor,
wherein the fluid sensor measures a change of the physical property as the user lying on the container, and the control unit determines the body weight of the user based on the change of the physical property.

2. The apparatus according to claim 1, further comprising:
a valve connected to the container, allowing the fluid selectively flowing into and flowing out from the container.

3. The apparatus according to claim 1, further comprising:
a driving device for driving the fluid flowing into the container.

4. The apparatus according to claim 1, further comprising:
an emergent power supply providing a power when a normal power supply fails.

5. The apparatus according to claim 1, further comprising:
a modification device for modifying the pressure of the container according to the body weight of the user.

6. The apparatus according to claim 1, wherein the control unit modifies the pressure of the container according to the body weight of the user.

7. An apparatus for measuring a body weight of a user, the apparatus comprising:
a container containing a fluid inside for supporting the user, wherein the container includes a first cell and a second cell, and the first cell defines an opening while the second cell defines at least two openings for facilitating the fluid contained in the second cell flowing out faster than the fluid contained in the first cell;
a fluid sensor connected to the container, for measuring a physical property of the fluid inside the container; and
a control unit connected to the fluid sensor,
wherein the fluid sensor measures a change of the physical property as the user lying on the container, and the control unit determines the body weight of the user based on the change of the physical property.

8. The apparatus according to claim 1, wherein the physical property is pressure.

9. A container for supporting a user, comprising:
a first cell containing a first fluid inside for supporting the user and defining a first opening; and
a second cell containing a second fluid inside for supporting the user and defining a second opening, wherein the second opening is larger than the first opening for facilitating the second fluid flowing out faster than the first fluid, and the container is for use with an measuring apparatus for measuring a body weight of the user, the measuring apparatus further comprising:
a fluid sensor connected to the container, for measuring a physical property of the fluid inside the container; and
a control unit connected to the fluid sensor,
wherein the fluid sensor measures a change of the physical property as the user lying on the container, and the control unit determines the body weight of the user based on the change of the physical property.

10. A container for supporting a user, comprising:
a first cell containing a first fluid inside for supporting the user and defining an opening; and
a second cell containing a second fluid inside for supporting the user and defining at least two openings for facilitating the second fluid flowing out faster than the first fluid, wherein the container is for use with an measuring apparatus for measuring a body weight of the user, the measuring apparatus further comprising:
a fluid sensor connected to the container, for measuring a physical property of the fluid inside the container; and
a control unit connected to the fluid sensor,
wherein the fluid sensor measures a change of the physical property as the user lying on the container, and the control unit determines the body weight of the user based on the change of the physical property.

* * * * *